March 29, 1966     B. H. WALKER     3,243,118

SEDIMENT FILTER FOR INTERNAL COMBUSTION ENGINES

Filed Nov. 22, 1963

INVENTOR
Bruce H. Walker

BY

ATTORNEYS

United States Patent Office 3,243,118
Patented Mar. 29, 1966

3,243,118
SEDIMENT FILTER FOR INTERNAL
COMBUSTION ENGINES
Bruce Hartley Walker, 3054 Pio Nono Ave., Macon, Ga.
Filed Nov. 22, 1963, Ser. No. 325,617
4 Claims. (Cl. 237—12.3)

This invention is a novel sediment filter for automotive and like vehicles having an internal combustion engine which is provided with a water cooling jacket in which the water is circulated by a pump within the engine block and through a radiator, the heated water from the engine block being also circulated through a water heater usually disposed within the vehicle body through which heater the water from the engine block is circulated and returned to the engine block in the usual manner.

One object of the invention is to provide a by-pass around the heater connecting the inflow and outflow ducts of the heater and provided with a by-pass valve which, when the by-pass valve is closed, will cause the water to circulate through the heater, but when opened and the heater control valve closed, the water will circulate from the engine block through the by-pass and from thence returned to the engine block.

Another object of the invention is to provide a novel sediment filter trap disposed in the tube leading to the inlet end of the heater, said trap being disposed in advance of the by-pass so that any sediment which would otherwise collect in the engine block or in the radiator will be collected in the sediment filter trap, irrespective of whether or not the heater was being used.

It has been found that the debris from deteriorated water hose along with considerable amounts of rust in the usual water cooling circuits of heaters in automobiles is sufficient to completely stop off tightly the heater control valve, thus rendering it inoperative, and generally motorists are plagued with stopped-up radiators and engine overheating conditions.

My novel by-pass and sediment trap or filter is designed to trap these trouble-making accumulations which are developed in the cooling systems of automobiles so that the cooling system will be kept clean along with the heater irrespective of whether the heater is in use for winter driving or in non-use for summer driving.

A further object of the invention is to provide a sediment filter trap which is mounted between the engine block and the heater by-pass valve adapted to trap fine particles of rust on a screen within the filter and to catch other debris such as bits of deteriorated hose or other foreign matter which collects in the cooling systems of internal combustion engines and which would render the heater control valve inoperative, the use of the filter also insuring a cleaner flow of hot water to the heater core.

It has been found that the water going to the heater is hottest, and any rust that may accumulate in the cooling system will collect at this point and settle in the bowl of the sediment filter instead of contaminating all heater components. Such filter will allow cleaner water flowing through the heater valve and core and will eliminate needless removal for repairs or replacement of components of the heating system, and will also keep the engine block free of rust which usually collects and settles in the rear area of the engine block. This in turn will cause the engine to run cooler, will necessitate less repairs on the radiator and will add miles of trouble-free motoring.

Also, by incorporating my heater by-pass valve, when the by-pass valve is open for summer driving, the arrangement will insure a constant flow of cooling system fluid through the filter trap anytime the motor is operated, and will trap any rust or debris that may accumulate in the cooling system. Therefore a constant guard would be maintained to keep the cooling system clean when the motor is operated, eliminating expensive radiator repairs caused by stoppage and collection of rust to such point that the radiator would start to leak.

I will explain the invention with reference to the accompanying drawing to enable others familiar with the art to adopt and use the same, and will summarize in the claims the novel features of construction and novel combinations of parts for which protection is desired.

Figure 1:
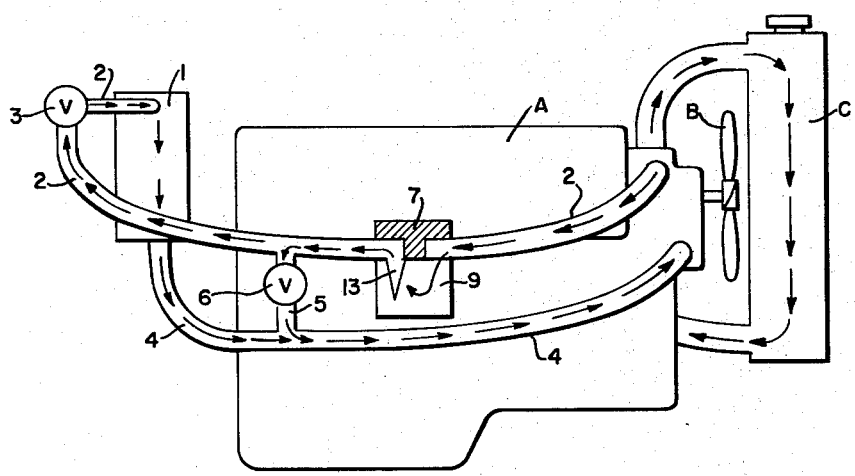
FIG. 1 is a side elevational view of an internal combustion engine block showing the arrangement of fan, radiator, heater, sediment trap and by-apss, and indicating the respective valves for controlling the heater and the by-pass.

The engine block A may be of any desired type in which the block is water-cooled assisted by an air fan B which drives a circulating pump (not shown) disposed within the engine block for normally circulating the cooling water in the block through a radiator C in the direction of the arrows indicated in FIG. 1, the water entering the radiator C at the top and being discharged back into the engine block A at the bottom of the radiator C. Such construction is well known and forms no part of my present invention.

Associated with the engine is a heater 1 of conventional type which is connected by tube 2 with the engine block A as shown in FIG. 1, a heater control valve 3 being interposed in the tube 2 adjacent the heater 1, whereby when valve 3 is open the water will flow in the direction of the arrows, FIG. 1, from the engine block A to the heater 1. The water return tube from the heater 1 is indicated at 4 connecting the bottom of the heater 1 with the engine block A in the vicinity of the water circulating pump (not shown), the water normally passing through the tube 4 in the direction of the arrows shown in FIGS. 1 and 3, when valve 3 is open.

Figures 2, 3:
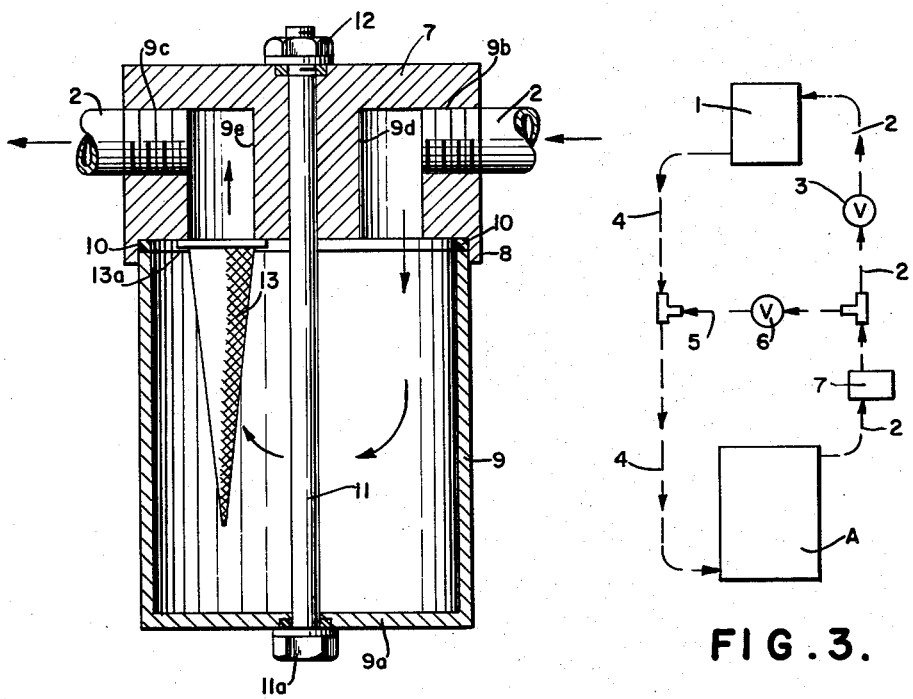
FIG. 2 is an enlarged vertical sectional view through the sediment trap.
FIG. 3 is a diagrammatic view showing the arrangement of parts shown in FIG. 1.

In order to by-pass the heater 1, for summer driving, when valve 3 is closed, I provide a novel by-pass tube 5 connecting the tubes 2 and 4 in advance of the heater 1, said bypass 5 having a valve 6 therein which when opened will permit the water circulating in tube 2 to pass through by-pass 5 as indicated by the arrows in FIGS. 1 and 3 to the return tube 4, while the heater valve 3 is closed and the heater 1 inoperative. In this manner by proper operation of the valves 3 and 6 the water from the tube 2 may be passed directly into the heater 1 or passed directly through the by-pass 5 and returned to the inflow tube 4 and from thence to the engine block A.

In the tube 2 between the engine block A and the by-pass 5 I provide a novel sediment filter trap shown more particularly in FIG. 2, the same being so positioned that all water circulated in the cooling system of the motor A will necessarily pass through the filter trap irrespective of the setting of the by-pass valve 6 or the heater control valve 3. Thus the filter will be in operation any time that the motor A is operating.

As shown, the filter comprises a substantially cylindrical head 7 preferably mounted on the block A and having a peripheral flange 8 at its lower end adapted to receive the upper end of a sediment bowl 9 having an open upper end and having its lower end closed as at 9a, a gasket 10 being interposed between the top of the bowl 9 and the bottom of the head 7, as shown in FIG. 2, the parts 7, 8 and 9 being normally held in fixed relation by means of a bolt 11 having a head 11a at its lower end and a nut 12 at its upper end, the bolt 11 being disposed axially of the head 7 and bowl 9. When nut 12 is removed from the bolt 11 the members 7 and 9 may obviously be separated from removal of the sediment and other debris from the bowl.

In the sides of the head 7 are diametrically opposed threaded bores 9b and 9c for the reception of the threaded ends of the tube 2, as shown in FIG. 2, the inner ends of the bores 9b and 9c communicating with vertical bores 9d and 9e, which extend through the bottom of the head 7, so that the water may enter the inlet 9b–9d and pass downwardly into the bowl portion 9, and from thence upwardly through a filter screen 13 disposed over the lower end of the vertical bore 9e which communicates with the outlet bore 9c.

As shown, the filter screen 13 is preferably in the form of an inverted cone and is preferably of stainless steel having about 400 mesh, the upper larger end of the screen cone being secured to a ring 13a or the like which may be clamped between the top of the bowl 9 and the bottom of the head 7, or removably secured thereto in any desired manner, such as by screws.

Thus it will be seen that all water that passes through the tube 2 irrespective of whether the heater is or is not in operation, must necessarily pass through the sediment filter trap and through the screen 13, the mesh of which is sufficiently fine to prevent passage of any foreign matter, such as rust or deteriorated hose, from passing beyond the filter 13 toward the by-pass 5 or the heater 1, whereby all the water circulated in the block and the heater or by-pass will be kept clean and free from rust and any other contamination, and the water in the tube 4 will be returned to the motor block A and will be filtered in its cycle, resulting in cleaner and more efficient operation of the cooling system.

Summarizing, my invention, as above explained, prevents heater valve contamination; prevents heater core contamination; prevents the heater and cooling system tubes or hoses from becoming congested with rust and debris; all engine circulator parts are cleaner and afford a more efficient operation dispensing with repairs on any heater or radiator components due to overheating, clogged valves, etc. By use of the heater by-pass valve constant filtering action is obtained on the complete cooling system of the engine all the time the engine is in operation. My novel filter can be easily mounted on any past or future motor vehicle, or stationary power equipment, utilizing a liquid cooling system. The filter is relatively simple in construction, weighs only 3½ pounds, is economical to make and very compact; and removal, disassembly and cleaning would only take approximately ten minutes when the filter becomes filled with debris, or at periodic checkups.

I do not limit my invention to the exact form shown in the drawing, for obviously changes may be made therein within the scope of the claims.

I claim:

1. In combination with the engine block of a water-cooled engine having a water pump for circulating the water in the engine block in a continuous circuit through a radiator and for returning water in the radiator to said engine block; a heater separate from the engine block and connected by an inlet tube in said continuous circuit to the engine block, and connected in said continuous circuit by a return tube to the engine block, said pump thereby circulating the water in the engine block through said heater; a heater control valve in said inlet tube adjacent said heater; a by-pass tube connecting the inlet and return tubes in advance of the control valve and heater; a by-pass valve in the by-pass tube; and a sediment filter trap in said inlet tube in advance of the by-pass tube, whereby when the heater valve is closed and the by-pass valve is open while the engine is in operation the portion of the water circulated through the tubes and radiator will pass through the trap.

2. In a combination as set forth in claim 1, said sediment filter trap comprising a circular head having inlet and outlet ducts respectively connected to the inlet tube, said ducts opening at the bottom of the sead; a removable sediment bowl having an open upper end disposed below said head; an axially disposed bolt transfixing the head and bowl for detachably securing the bowl and head together; and a filter screen having a ring detachably clamped betwen the underside of the head and the top of the bowl over the outlet duct to prevent passage of sediment and other foreign matter past the screen and into the outlet duct, the said sediment collecting in the said bowl.

3. In combination with the engine block of a water-cooled internal combustion engine having a water pump for circulating the water in the engine block in a continuous circuit through a radiator and for returning water in the radiator to said engine block; a heater disposed exteriorly of the engine block connected by an inlet tube to the said circuit, and connected by a return tube to the said circuit, said pump thereby circulating the water in the engine block through said heater; a heater control valve in said inlet tube adjacent said heater; a by-pass tube connecting the inlet and return tubes in advance of the control valve and heater; a by-pass valve in the by-pass tube; and a sediment filter trap in said inlet tube in advance of the by-pass tube, whereby when the heater valve is open and the by-pass valve is closed while the engine is in operation the portion of the water circulated through the tubes and radiator and heater will pass through the trap.

4. In a combination as set forth in claim 3, said sediment filter trap being mounted on the engine block and comprising a circular head having inlet and outlet ducts respectively connected in the inlet tube, said ducts opening at the bottom of the head; an annular flange around the bottom of the head; a removable sediment bowl having an open upper end received in said annular flange, with a gasket interposed between the bowl and head; an axially disposed bolt transfixing the head and bowl for detachably securing the bowl and head together; and an inverted conical filter screen having a ring detachably clamped between the underside of the head and the top of the bowl over the outlet duct to prevent passage of sediment and other foreign matter past the screen and into the outlet duct, the said sediment collecting in the said bowl.

References Cited by the Examiner

UNITED STATES PATENTS

| Re. 16,209 | 11/1925 | Justus | 210—444 X |
| 712,089 | 10/1902 | Piatt | 165—119 |
| 1,002,099 | 8/1911 | Waterhouse | 210—444 |
| 1,671,606 | 5/1928 | Pierce | 210—444 |
| 1,931,988 | 10/1933 | Hromadka | 165—119 |
| 1,992,472 | 2/1935 | Craig | 237—12.3 |
| 2,057,128 | 10/1936 | Angstman | 237—12.3 |
| 2,304,642 | 12/1942 | Hans | 237—12.3 X |
| 2,980,257 | 4/1961 | Paton | 210—444 X |
| 3,134,366 | 5/1964 | Miller. | |

EDWARD J. MICHAEL, *Primary Examiner.*

FREDERICK L. MATTESON, JR., *Examiner.*

M. L. BATES, *Assistant Examiner.*